United States Patent [19]

Eisenberg

[11] 4,268,946
[45] May 26, 1981

[54] METHOD FOR FINISHING A PLATE

[75] Inventor: Arnold J. Eisenberg, Granville, Ohio

[73] Assignee: Owens-Corning Fiberglas Corporation, Toledo, Ohio

[21] Appl. No.: 804,825

[22] Filed: Jun. 8, 1977

[51] Int. Cl.³ .............................................. B23P 17/00
[52] U.S. Cl. .................................. 29/424; 51/283 R; 269/7
[58] Field of Search ............. 29/424, DIG. 26; 269/7; 51/216 R, 227 R, DIG. 15, 277, 283 R; 83/14, 54; 65/174

[56] References Cited
U.S. PATENT DOCUMENTS

| 2,499,977 | 3/1950 | Scott | 29/424 X |
| 2,855,664 | 10/1958 | Griffith et al. | 29/424 |
| 3,216,154 | 11/1965 | Christen et al. | 51/283 |
| 3,596,317 | 8/1971 | Nicholson | 269/7 X |
| 3,849,878 | 11/1974 | Rudd et al. | 29/424 X |

Primary Examiner—Ervin M. Combs
Attorney, Agent, or Firm—Ronald C. Hudgens; Philip R. Cloutier; Kenneth H. Wetmore

[57] ABSTRACT

The invention relates to method and apparatus for finishing a plate having projections extending therefrom comprising reinforcing the projections of the plate with a material which can be removed without damage to the projections, cutting the projections to desired length, and removing the material.

11 Claims, 4 Drawing Figures

METHOD FOR FINISHING A PLATE

BACKGROUND OF THE INVENTION

The present invention relates to method of, and apparatus for, the production of feeders for manufacturing glass fibers. More particularly this invention relates to the orificed section or tip plate of the feeder.

The orificed feeder floor which has tips or projections is generally made of a high temperature alloy such as a platinum and rhodium alloy. In the production of a tip plate the tips or projections are machined to a finished height. Care must be taken in the machining of the thin projection walls as they can distort and burr over when subjected to even a minimal tooling pressure. Thus, electrical discharge machining has been used for machining the projections to finished height. Electrical discharge machining, or EDM, operates on the principal of disintegrating metal with electrical energy. An electrode is fitted into a chuck of a EDM machine and lowered to within a few thousandths of an inch of the work piece. Electrical arcs are produced in the space between the electrode and the workpiece. There are essentially no machining forces produced by the EDM'ing because the electrode never touches the workpiece.

Although the EDM process has been used, it has some drawbacks. One disadvantage is its relatively slow production rate as compared to conventional machining or cutting operations. Another disadvantage is that the disintegrated precious alloy removed from the projections in the EDM machining operation is difficult to separate and recover from the disintegrated material from the EDM electrodes. Recovery of the machined off alloy is economically very important to the plate finishing operation.

Improved method and apparatus for finishing a plate are needed.

SUMMARY OF THE INVENTION

An object of the invention is improved method and apparatus for producing a glass fiber feeder.

Another object of the invention is improved method and apparatus for producing a finished tip plate.

These and other objects are attained by method for finishing a plate having projections extending therefrom comprising reinforcing the projections of the plate with a material which can be removed without damage to the projections, cutting the projections to desired length, and removing the material and by apparatus for finishing a plate having projections extending therefrom comprising means for reinforcing the projections with a material which can be removed without damage to the projections, means for cutting the projections to desired length and means for removing the material.

Other objects and advantages will become apparent as the invention is described in more detail with reference made to the accompanying drawings.

DESCRIPTION OF THE PREFERRED EMBODIMENTS

The following description of the preferred embodiment which comprises a glass fiber tip plate finishing operation is offered for purposes of illustration of the principals of this invention, and is not intended to be limiting.

Figure 1:
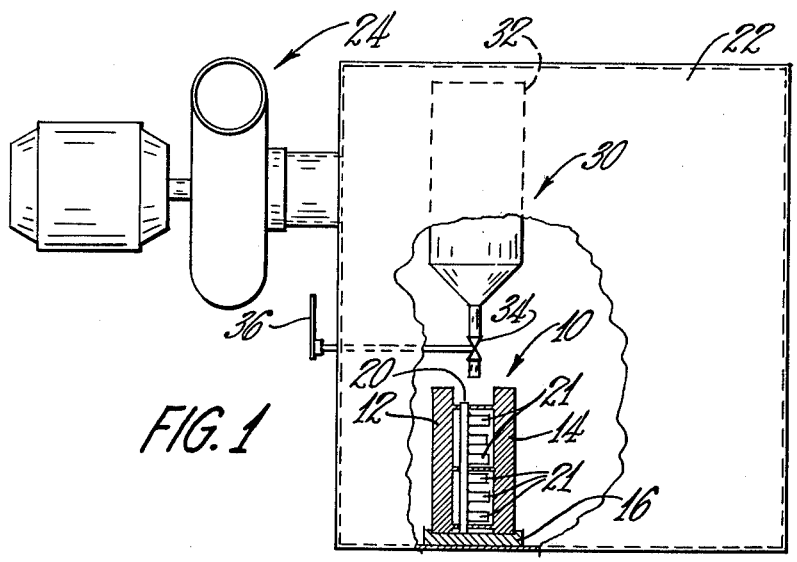
FIG. 1 is an elevation partly in section of apparatus for reinforcing or encapsulating the plate according to the principals of the invention.

In FIG. 1, there is shown mold and tip plate assembly 10. Tip plate 20 has projections 21 extending therefrom. The plate is held between mold halves 12 and 14. The mold sections are supported by support 16.

The mold and plate assembly is positioned inside vacuum chamber 22. The chamber can be evacuated by conventional vacuum equipment as illustrated by vacuum apparatus assembly 24.

Material dispensing assembly 30 deposits material in the mold to reinforce the plate and projections by encapsulating the plate and projections in a machinable matrix. The material is held in chamber 32 and dispensed through valve 34 when handle 36 is operated to open the valve. The material is poured under vacuum to insure the material is free of air bubbles and to insure the entire plate including inside the projections is encapsulated by the material. If there are air bubbles in the material or incomplete encapsulation of the plate, the support or reinforcement supplied by the material to the plate is reduced.

Figure 2:
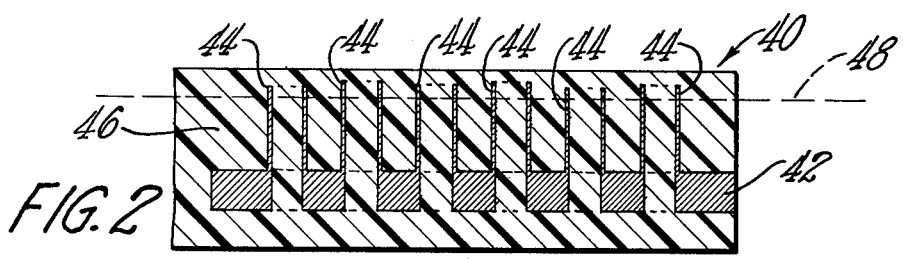
FIG. 2 is a sectional view of the plate as reinforced or encapsulated by the device shown in FIG. 1.

FIG. 2 shows an encapsulated plate like that which would be produced by the apparatus of FIG. 1. Tip plate 42 has projections 44 extending therefrom. The projections are of a tubular shape and have relatively thin fragile wall sections. The unfinished projections are of varying length and have non-uniform end regions. As shown, the orifices of the tubular projections extends through the plate and the reinforcing material fills the orifices.

The projections of the plate are reinforced by the matrix of material 46. This material surrounding and supporting the projections permits molded assembly 40 to be machined by conventional techniques without distortion of the projections. The matrix reinforces each projection wall during machining in much the same way as a piece of thin veneer is reinforced when placed between two pieces of wood for sawing. For veneer, a square splinter-free cut results because of the support. And, for the finished plate, burr free and distortion free cut projections result because of the reinforcement. A conventional single point fly cutter in a vertical mill has been used successfully to machine a molded assembly such as assembly 40. Other conventional mechanical cutting devices such as a multitooth milling cutter, a shaper or a surface grinder can be used to machine the matrix.

Molded assembly 40 is machined to cut the projections to the desired height. In FIG. 2, line 48 illustrates a cutting height which would produce uniform projections of a single height. Other cutting heights or patterns could be employed to produce projections with varying heights along the plate.

Different machinable materials can be used for the reinforcing or encapsulating material. The material must be strippable or removable from the plate without damage to the projections so that after the machining operation has been completed the material can be removed from the plate to produce sound projections free from defects or damage. An unfilled thermoset resin such as epoxy has been found to be satisfactory. After machining, the epoxy material can be removed from the plate by heating the reinforced plate to a sufficient temperature below the distortion temperature of the platinum/rhodium alloy of the plate to burn the epoxy from the plate. Thermoplastic resins can be used to encapsulate the tip plate and then removed, after machining of the projections, by melting or burning the resin from the plate. Also, other thermoset resins such as a solvent strippable thermoset resin could be used to encapsulate the plate. A low melting alloy such as one of lead/tin/bismuth can be used. An advantage of the low melting alloy is that the encapsulating material is melted to remove it from the plate without damage to the plate and then recovered and reused.

The material cut from the molded assembly during the machining operation can be collected and essentially all of the precious alloy from the plate can be recovered. The alloy in the chips cut from the projections of the plate can be separated from the reinforcing material in the same manner that the material is separated or stripped from the finished plate.

Figure 3:
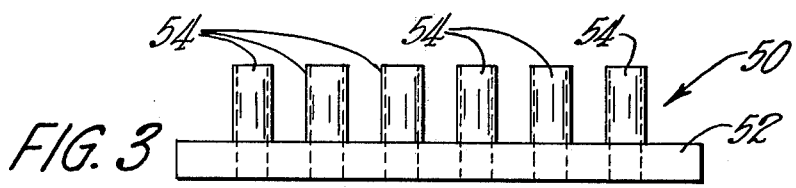
FIG. 3 is an end view of the plate after the projections have been machined to desired height and the material has been removed according to the principals of the invention.
Figure 4:
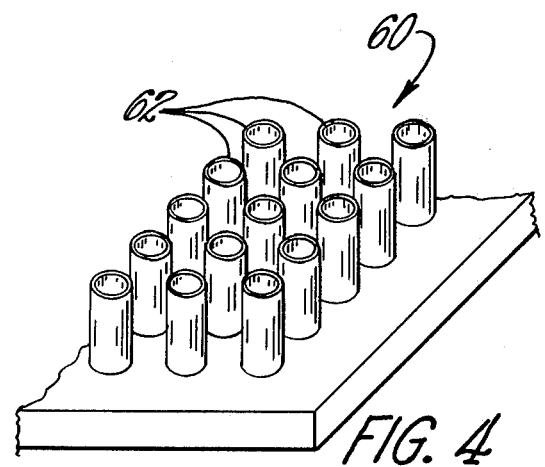
FIG. 4 is a fragmentary perspective of a finished plate like that of FIG. 3.

FIGS. 3 and 4 show a finished tip plate according to the principals of the invention. The tips have been machined to a uniform desired length and the reinforcing material then removed.

Various modifications of the above described embodiment of the invention will be apparent to those skilled in the art, and it is to be understood that such modifications can be made without departing from the scope of the invention.

I claim:

1. Method of finishing a high temperature resistant plate having projections extending therefrom for use in the manufacture of glass fibers comprising:

(a) reinforcing the projections of the plate with a material which can be removed without damage to the reinforced projections;

(b) cutting off the end regions of the reinforced projections such that the projections extending from the plate are each of a desired length; and (c) removing the material.

2. The method of claim 1 wherein the projections are all cut to the same length.

3. The method of claim 1 wherein the projections are of a tubular shape and are reinforced by encapsulating the inside and the outside of the projections in the material.

4. The method of claim 2 wherein the entire plate is encapsulated by the material.

5. The method of claim 1 wherein the material reinforcing the projections is a resinous material.

6. The method of claim 4 wherein the resinous material is removed from the projections by heating the reinforced plate to a sufficient temperature below the distortion temperature of the plate to burn the material from the projections.

7. The method of claim 1 wherein the material reinforcing the projections is a low melting temperature alloy.

8. The method of claim 6 wherein the alloy material is removed by melting the material from the projections.

9. The method of claim 1 wherein the projections are cut by mechanically milling the projections.

10. The method of claim 1 including the steps of placing the plate in a vacuum chamber, evacuating the chamber and reinforcing the projections with the material in the evacuated chamber.

11. The method of claim 1 including the steps of collecting the cuttings from the cutting step and removing the material from the cuttings to recover the cut off portions of the projections.

* * * * *